April 16, 1946. R. C. HAFF 2,398,425
PROCESS FOR TREATING ALUNITE ORES AND THE LIKE
Filed April 27, 1943
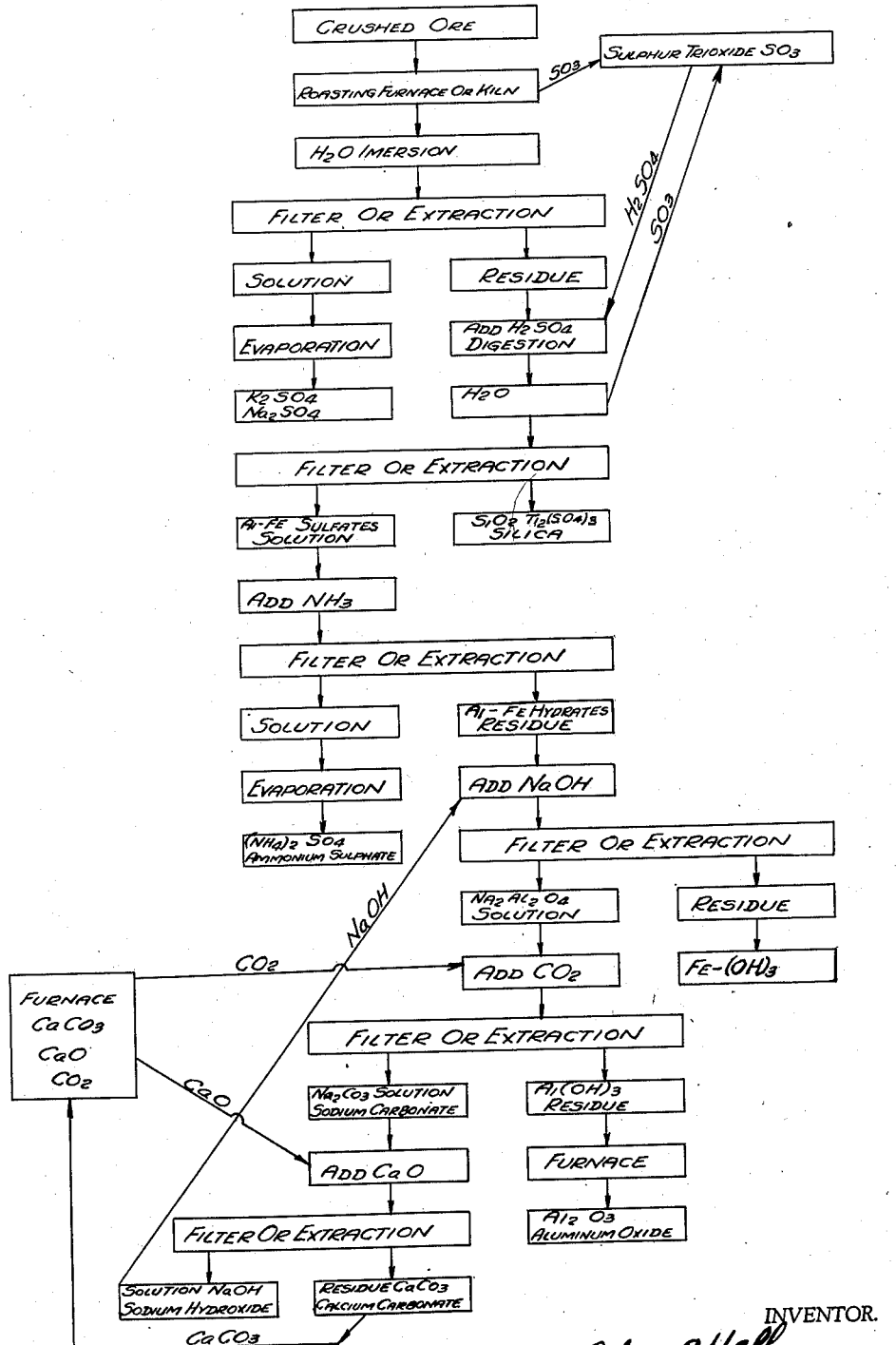
INVENTOR.
BY Robert C. Haff
Richard E. Marine
His Attorney Patented Apr. 16, 1946

2,398,425

UNITED STATES PATENT OFFICE 2,398,425

PROCESS FOR TREATING ALUNITE ORES AND THE LIKE

Robert C. Haff, Mount Vernon, Ky., assignor to Elnathan H. Steinman, Pittsburgh, Pa.

Application April 27, 1943, Serial No. 484,752

6 Claims. (Cl. 23—141)

My invention relates to the treatment of ores containing aluminum compounds, or potassium and aluminum compounds, and other materials associated therewith as impurities, such as silica, iron, titanium, magnesium and calcium compounds, to recover therefrom in their commercially pure state all of the valuable products therein contained, or such of said products as may be desirable. More particularly it relates to the recovery of such products from alunite ores and the like, and any impurities therein which have not heretofore been successfully processed commercially.

This case is a continuation, in part, of my prior application, Serial No. 352,157, filed August 10, 1940.

Of the valuable products derivable, for instance, from alunite and the like, which may be economically recovered in their commercially pure state by my process, are potassium sulphate, aluminum sulphate, titanium sulphate, iron sulphate, ammonium sulphate, aluminum oxide, silica oxide, iron and titanium oxide and sulphuric acid. Each of these products have well known commercial values. The silica oxide itself, which has heretofore not been recovered, has a high value when recovered in its commercially pure state, and, as it is accomplished by my process, may be used, for instance, in the manufacture of eye glasses and like optical instruments, in the refining of oils, etc.

Prolific sources of alunite ores are found in the United States, whereas the greater portion of the aluminum bearing ores for the manufacture of commercial aluminum compounds and metallic aluminum are imported from foreign countries. These alunite ores differ greatly in the amount of impurities contained therein, according to their elevation, most of those found at lower elevations being the lower grades. Prior to my invention no commercial process was known that would successfully treat any of these ores to recover therefrom the products enumerated above in sufficiently pure state to render them marketable.

One of the principal reasons why former attempts have met with no success is the fact that the problem has been approached by others essentially from a theoretical point of view, theoretical or paper formulas being assumed and the processes devised taking into account only the conditions assumed in such formulas, as given in chemical textbooks and other publications, none of which took into consideration the fact that impurities were always present in the ore, thereby changing the chemical procedure rendered necessary by the presence of these impurities.

I have devised a practical process not limited to the narrow scope of a theoretical formula, but one which provides for all contingencies in a very simple, but very practical manner, in a minimum of steps and at low cost.

My process is a continuous one and the only active materials necessary to its operation are reclaimed as by-products, thus not only greatly reducing the cost of materials, but obviating the necessity and cost of haulage. My process is a susbtantially self-contained one, largely automatic and continuous after being once initiated.

I do not assume a definite formula for alunite, nor do I assume that it is pure, as indicated by such formulas, but in every step of my process provide for such items as ranges of temperatures, excess of materials and special tests to determine when the several steps are completed, giving a factor of safety, regardless of the variations in the composition of the ore being treated, which enables the complete removal of each product at the desired stage in the process without any remnant requiring further treatment and without losses due to reactions of such remnants with the remaining materials, which it is desired to remove in subsequent steps of the process. These differences over prior processes will be obvious to the skilled chemist from the detailed description of my process.

Moreover, by my invention I have materially reduced the time required for the complete operation, thereby making it commercially efficient and reducing costs.

The accompanying flow sheet shows for purpose of exemplification but without limiting my invention or claims thereto a preferred embodiment of my invention.

Alunite in its natural state contains primarily insoluble sulphates of potassium and aluminum, aluminum oxide and water of combination with other materials in smaller amount as impurities. The lower grade alunite ores contain more impurities than higher grade alunite ores. The principal impurities which must be removed to obtain marketable products, such as silica, iron and titanium, are the most difficult to remove.

For the purpose of illustration, I give below the analyses of four typical samples of alunite ore to which my process has been successfully applied.

Analyses

|  | Sample | | | |
| --- | --- | --- | --- | --- |
|  | No. 1 | No. 2 | No. 3 | No. 4 |
|  | Per cent | Per cent | Per cent | Per cent |
| Alumina | 33.60 | 37.10 | 33.25 | 30.45 |
| Silica | 15.40 | 4.04 | 23.56 | 19.11 |
| Sulphur trioxide | 31.48 | 35.62 | 28.60 | 30.92 |
| Potassium oxide | 7.56 | 10.29 | 6.92 | 7.28 |
| Sodium oxide | 0.16 | 1.33 | 3.73 | 3.27 |
| Combined water | 10.50 | 10.50 |  | 6.88 |
| Titanic acid | (1) | .80 | .20 | .19 |
| Iron oxide | Trace | .02 | .60 | 1.80 |
| Magnesium oxide | None | .18 | .28 | .12 |
| Water soluble |  |  | .08 |  |
| Calcium | 1.40 |  | .90 | Trace |

[1] Any titanium present reported with the alumina.

In the practice of my invention the procedure in the treatment of the above impure alunite ores is as follows:

The impure alunite ore is first crushed to a size to permit efficient heating to change all the insoluble potassium constituents to the form of soluble sulphates, and all the aluminum compounds to aluminum oxide which is insoluble. Any permissible size of crushed ore to accomplish the desired result, may be used. I have found, however, that if a rotary kiln is used the ore should be ground preferably through a 4 mesh screen, or finer, because it effects greater fuel economy and requires less time to fully complete the calcination.

I have further found it desirable to separate the material which will pass a 30 mesh screen from the 4 mesh material and calcine them in separate operations, since they require different times and temperatures for most efficient calcining. This time and temperature can be controlled by one skilled in the art by the aid of known devices. The two factors of great importance, which must be balanced against each other for optimum results are the temperature used and the time necessary for proper results in calcining.

Should a vertical kiln be used the ore should preferably be of four to twelve inch size.

While it is possible to use a calcining temperature between 600° C. and 1100° C., I have found it highly advantageous, for impure alunite ores, to operate within the range of 750° C. to 950° C. The optimum temperatures and time for most efficient calcination varies in accordance with the impurities present in the ore. I have found that for most impure alunite ores a range of 775° to 900° C. is most advantageous.

The last mentioned range of temperatures is a highly important feature of my invention in securing the highest efficiency in recovery of the $K_2SO_4$ and $Al_2O_3$ from impure alunite ores for the reasons indicated below. The amount of the impurities contained in the ore control the time and temperature necessary for maximum efficiency and purity of products.

The time and temperature should preferably be such that a pH between 3.5 and 7.0 is obtained in the subsequent solution of the soluble portions of the calcine. When the pH is too low, some of the alumina in the calcine will become soluble as $Al_2(SO_4)_3$ and will be later leached out with the soluble $K_2SO_4$, causing loss of $Al_2O_3$. When the pH is too high some of the $SO_3$ has been driven from the $K_2SO_4$, leaving $K_2O$ which combines with some of the $Al_2O_3$ and $SiO_2$ forming insoluble potassium aluminum silicate, thereby causing substantial loss of $K_2SO_4$ and destroying the commercial value of the $Al_2O_3$. This takes place at about 200° C. below 1069° C. at which point the decomposition of pure $K_2SO_4$ occurs. Also, when too high a temperature and too long a time are used in calcining, not all the $Al_2O_3$ will digest with $H_2SO_4$, hereinafter referred to, and become soluble, but part of the $Al_2O_3$ will remain insoluble, causing a large loss in $Al_2O_3$ recovery.

The silica content of different alunite ores differs in amount and when too high calcinating temperatures and too long times are used the respective amounts of silica present combine with proportionate amounts of $Al_2O_3$ and $K_2O$ to form an insoluble compound. The proper temperature and pH values vary correspondingly. In the four examples given below I have found that the approximate times and temperatures necessary to obtain the proper pH's to prevent such combination, when the respective percentages of silica present are as indicated, are as follows:

When the silica in the alunite ore is below 7.5% the pH should be approximately from 5.5 to 7.00. To obtain this result the temperature should be approximately from 850° to 900° C. for a period of two to four hours. When the silica content is from 7.5% to 10.5% the pH should be 4.5 to 6.0 and the temperature from 840° to 875° C. for a period of three to four hours. When the silica content is from 10.5% to 15% the pH should be from 4.0 to 5.0 and the temperature from 825° to 850° C. for a period of three to four hours. When the silica content is from 15% to 23%, the pH should be 3.5 to 4.5 and the temperature from 775° to 825° C. for a period of two to three hours.

During the calcining operation the desired range of temperature is maintained until all the potassium sulphate is in a soluble state and all the sulphur trioxide vapors present with the alumina in the impure alunite ore are driven off. During this operation an oxidizing atmosphere must be maintained throughout. This is conveniently effected by introducing air or steam in excess of the amount necessary to be used with the fuel in calcining. By maintaining an oxidizing atmosphere we are able to pass the sulphur trioxide vapors continuously through a water spray to produce a sulphuric acid solution. If a reducing atmosphere were present the sulphur trioxide would be reduced to sulphur dioxide and to recover the latter as sulphuric acid would necessitate the installation of a sulphuric acid plant, which would be very costly. The sulphur trioxide vapors can also be recovered by any well known electrical precipitation process.

The sulphur trioxide vapors are passed thru a water spray in such relative quantities as to produce concentrated or dilute sulphuric acid, as may be desired, which is advantageously conveyed continuously to a subsequent stage of my process, hereinafter referred to.

The calcined material from the discharge end of the furnace or kiln should be crushed by rolls, if necessary, and immersed in water sufficient in quantity and temperature to completely dissolve all the $K_2SO_4$ and any $Na_2SO_4$, if present, to keep the solution slightly below the concentration point. The calcined material leaves the kiln at a relatively high temperature and serves as an economical source of heat for the water. When the $K_2SO_4$ and $Na_2SO_4$ are completely dissolved the solution and insolubles are passed thru a filter press, separating the solution from the insolubles. This solution may be treated by known methods to recover therefrom the $K_2SO_4$ and also the Na₂SO₄, if present, as separate commercial products.

The insoluble residue from the K₂SO₄ leach, containing Al₂O₃, SiO₂, Fe₂O₃, Ti₂O₃ and any other impurities, if present is treated in the following manner; sulphuric acid, either concentrated or dilute, is added to the insoluble residue in substantial excess of the amount required to convert all the Al₂O₃ to soluble Al₂(SO₄)₃ and any Fe₂O₃ or Ti₂O₃, to soluble Fe₂(SO₄)₃ and Ti₂(SO₄)₃ respectively, and heated to a temperature sufficient to start the reaction. If concentrated sulphuric acid is employed the reaction will begin when water is added to bring the compound in solution.

I have found that a 30% excess of sulphuric acid over the amount required to convert the oxides last mentioned to sulphates is most desirable, as the temperature is increased by the reaction to a point slightly below 300° C. during the time that the change from the oxides to the sulphates take place and because of the increased temperature H₂SO₄ is driven off as SO₃ vapors and some SO₂ vapors if present. The boiling point of H₂SO₄ of thirty percent strength is below 146° C. and the boiling point of concentrated H₂SO₄ of full strength is below 280° C. Since the digestion temperatures here imposed are between 150° C. and 300° C. depending upon the strength of the acid used some acid is lost. The temperature during this reaction decreases as the strength of the acid used decreases. For 30% strength of acid the temperature is approximately 175° C. Sulphuric acid vaporizes about 150° C. and below the critical temperature of approximately 300° C. which is the working range of the process depending upon the concentration of the acid solution and if no excess acid is present, not sufficient sulphuric acid would be left to completely change the insoluble oxides to soluble sulphates, therefore leaving some of the oxides insoluble due to not having sufficient sulphuric acid present. Those experienced in the art have not realized the importance of using this excess of acid to convert all the aluminum, iron and titanium oxides to soluble sulphates but have gone on the theory that the amount of sulphuric acid to actually bring about these chemical conversions, with no allowance for the SO₃ vaporized at the temperature created by the chemical reaction, was all that was needed. This is one of the reasons why prior attempts to produce a commercial product from alunite has failed.

I have found that dilute solution of sulphuric acid in the digestion is much to be preferred to a strong solution and that the optimum strength approximating a 30% solution of sulphuric acid is preferred. I have found that at this strength the SiO₂ is more easily and completely removed than when more concentrated sulphuric acid is used; when the sulphuric acid added, is highly concentrated, the SiO₂ is divided into very fine particles and is very difficult to retain as a solid since this causes it to become a colloidal silicic acid and is impossible to separate from the solution, thus causing the soluble Al₂(SO₄)₂ to be contaminated with part of the insoluble SiO₂, therefore destroying the Al₂O₃ as a commercial product when at a later period the Al₂(SO₄)₃ is converted to Al₂O₃. Also the use of the dilute acid in the digestion gives a slurry which is at all times fluid and therefore is easier and more economical to handle when continuous agitation is employed, such as is used in my process. In driving off the excess sulphuric acid the solution is digested and heated to a temperature from 150° C. to 300° C. which is below the point where any part of the alumina (Al₂O₃) would combine with any impurities to form an insoluble mass. This is a very important feature of my invention which I believe has not been previously recognized. This heating is preferably continued until all the alumina is converted into aluminum sulphate (Al₂(SO₄)₃). Agitators are preferably used to keep the insoluble matter in suspension while digesting. The excess sulphur trioxide (SO₃) is driven off as a dense white vapor, which is recovered and may be passed back to the aforementioned water spray, or to any other well known converter to form further sulphuric acid. Complete transformation of the insoluble aluminum oxide to the soluble sulphate form may take place before all of the excess sulphur trioxide vapors are diven off, but I prefer to use the disappearance of this white vapor as a signal that complete conversion has taken place, no other time measurements ordinarily being essential. This also shows that all the excess sulphuric acid is driven off, therefore making the Ti₂(SO₄)₃ present insoluble, as Ti₂(SO₄)₃ is insoluble in cold or hot solutions when no excess sulphuric acid is present, but is slightly soluble when a small excess of sulphuric acid is in the solution. This also is a highly important feature of my invention.

To the digested material sufficient cold or hot water is added to bring into solution all the Al₂(SO₄)₃ and any of the Fe₂(SO₄)₃ present. Iron and titanium sulphates do not come down as oxide because iron sulphate does not decompose below 480° C. and titanium sulphates at much higher temperature. Should it be desired to market the Al₂(SO₄)₃ as a commercial product, the solution is evaporated to dryness and marketed as such.

To the solution containing the soluble aluminum, iron and titanium sulphates, ammonium hydroxide is added in sufficient amount or excess to convert all the soluble aluminum sulphates, and the iron sulphates, if any, to the insoluble hydroxides of aluminum, and iron, and the soluble ammonium sulphate, or any other sulphates, such as traces of potassium or sodium and the like, remaining in solution. The insoluble aluminum and iron hydroxides are separated by filter or other means of extraction, such as settling tanks, thickeners or filter press, and the insoluble hydroxides are partially or thoroughly washed.

To the insoluble aluminum and iron hydroxides a solution of NaOH (or KOH if desired, which will give the same subsequent results) is added in sufficient quantity to convert the aluminum hydroxide present to soluble sodium aluminate or potassium aluminate. The iron hydroxide remains insoluble and is removed from the solution with any other insolubles present, by filtration or other means of extraction and partly or thoroughly washed.

The solution containing sodium aluminate or potassium aluminate is placed in a tank or vat, and carbon dioxide gas (CO₂) is added in a sufficient quantity to convert all the sodium or potassium present in the sodium or potassium aluminate to soluble sodium or potassium carbonate, the aluminum present being converted to aluminum hydroxide, which is insoluble.

The insoluble aluminum hydroxide is removed by filter or other means of extraction, settling tanks or thickeners, and partly or thoroughly washed, and later calcined.

To the solution of sodium or potassium carbonate, a sufficient quantity of calcium oxide (CaO) is added to change the soluble sodium or potassium carbonate to soluble sodium or potassium hydroxide and insoluble calcium carbonate ($CaCO_3$). The insoluble $CaCO_3$ is removed by filter or other means of extraction or settling tanks or thickeners. The $CaCO_3$ is then, wet or dry, fed into a kiln or furnace for calcining at a temperature of from 750° C. to 1100° C., which is sufficient to drive off all the $CO_2$, leaving the active CaO to be re-used in the process. The $CO_2$ is recovered and removed to a suitable container as a gas, ready to be re-used in the process. The CaO is also recovered and re-used in the process.

As a modification of my process, instead of adding $NH_4OH$ to the solution of soluble aluminum and iron sulphates, NaOH or KOH can be used in a sufficient quantity to precipitate the soluble hydroxides of aluminum and iron from the sulphates. The insoluble hydroxides of aluminum and iron are then removed by filter or other means of extraction. To the insoluble hydroxides of aluminum and iron an additional amount of NaOH or KOH is added so that a sufficient amount is present to combine with all the $Al(OH)_2$ to form the soluble sodium or potassium aluminate, leaving any iron hydroxide insoluble. For example, when 1410 lbs. $SO_3$ are present in the aluminum and iron sulphates this requires 1410 lbs. of sodium oxide (NaOH) to make 2503 lbs. of soluble sodium sulphate. The insoluble iron is removed by filter, or other means of extraction, settling tanks or thickeners. The residue is partly or thoroughly washed. To the solution of sodium or potassium aluminate, $CO_2$ is added in the same quantity as mentioned and outlined before, using the same procedure and the same recovery of the $CO_2$, CaO and sodium or potassium hydroxides.

The insoluble aluminum hydroxide obtained by adding $CO_2$ gas, as described above, is placed in a kiln or furnace and all the water of combination is driven off at a temperature below 800° C. converting all the aluminum hydroxide to alumina ($Al_2O_3$), in an essential chemically pure state so that it can be used for all known commercial purposes, including the manufacture of aluminum metal.

Prior to my invention, no commercial process known to me for the recovery of aluminum oxide from alunite ores has been devised which successfully produces an aluminum oxide of sufficient purity to adapt it for commercial use in the manufacture of aluminum metal or other commercial uses requiring a similar degree of purity. The impurities which have presented the greatest difficulty in removal are silica, iron, titanium and potassium. No other commercial process known to me eliminates these impurities to a sufficient degree to accomplish these results.

While I have specified the use of sulphuric acid as a digester in the above operation, I do not wish to limit myself thereto, but may employ in place thereof any of the chemicals, such as chlorides, potassium acid sulphate, sodium acid sulphate, calcium acid sulphate or carbonates and the like, from which the same results may be secured in the treatment of alunite and the like ores, and the soluble compounds of aluminum can be any of these.

While I have been more specific in describing my process as applying it to the treatment of alunite, it is applicable as described with modifications obvious to those skilled in the art, to the treatment of other analogous raw materials, such as ores, shales and the like.

It is obvious that many changes may be made in my process, as special conditions may indicate to be necessary or desirable, without departing from the spirit of my invention.

I claim:

1. The process of treating alunite and similar ores containing iron, titanium and silica impurities, to recover therefrom their valuable constituents, which comprises the steps of crushing and screening the ore to substantially uniform mesh sizes, heating said ore in an oxidizing atmosphere at temperatures from 750° C. to 950° C. until the sulfur trioxide combined with the alumina is driven off, leaching the residue with water so that a solution of potassium sulfate is obtained, separating the residual insoluble compounds containing alumina, silica, iron and titanium components, digesting said residual compounds with an acid, heating the acid solution until excess acid is removed, separating the acid solution of the aluminum and iron components from the insoluble silica and titanium components, treating the said solution so as to precipitate aluminum and iron hydroxides, separating said hydroxides from said solution and treating them with potassium hydroxide to convert the aluminum hydroxide to soluble potassium aluminate; separating the insoluble iron from the solution; adding carbon dioxide to the solution to convert the soluble aluminum to insoluble aluminum hydroxide; and heating said aluminum hydroxide to convert it into pure aluminum oxide.

2. The process of treating alunite and similar ores containing iron, titanium and silica impurities, to recover therefrom their valuable constituents, which comprises the steps of crushing and screening the ore to substantially uniform mesh sizes, heating said ore in an oxidizing atmosphere at temperatures from 750° C. to 950° C. until the sulfur trioxide combined with the alumina is driven off, leaching the residue with water so that a solution of potassium sulfate is obtained, separating the residual insoluble compounds containing alumina, silica, iron and titanium components, digesting said residual compounds with an acid, heating the acid solution until excess acid is removed, separating the acid solution of the aluminum and iron components from the insoluble silica and titanium components, adding potassium hydroxide to the said solution so as to precipitate aluminum and iron hydroxides, separating the insoluble hydroxides from the potassium solution; treating the insoluble hydroxides with additional potassium hydroxide to convert the aluminum hydroxide into soluble potassium aluminate; separating the insoluble iron from the solution; adding carbon dioxide to the solution to convert the potassium aluminate to aluminum hydroxide; and heating said aluminum hydroxide to convert it into aluminum oxide.

3. The process of treating alunite and similar ores containing iron, titanium and silica impurities, to recover therefrom their valuable constituents, which comprises the steps of crushing and screening the ore to substantially uniform mesh sizes, heating said ore in an oxidizing atmosphere at temperatures from 750° C. to 950° C. until the sulfur trioxide combined with the alumina is driven off, leaching the residue with water so that a solution of potassium sulfate is obtained, separating the residual insoluble compounds containing alumina, silica, iron and titanium components, digesting said residual compounds with an acid, heating the acid solution until excess acid is removed, separating the acid solution of the aluminum and iron components from the insoluble silica and titanium components, adding ammonia to the said solution so as to precipitate aluminum and iron hydroxides, separating said hydroxides from said solution and treating them with sodium hydroxide to convert the aluminum hydroxide into soluble sodium aluminate; separating the insoluble iron hydroxide from the solution; adding carbon dioxide to the solution to convert the soluble sodium aluminate to insoluble aluminum hydroxide; and heating said aluminum hydroxide to convert it into pure aluminum oxide.

4. The process of treating alunite and similar ores containing iron, titanium and silica impurities, to recover therefrom their valuable constituents, which comprises the steps of crushing and screening the ore to substantially uniform mesh sizes, heating said ore in an oxidizing atmosphere at temperatures from 750° C. to 950° C. until the sulfur trioxide combined with the alumina is driven off, leaching the residue with water so that a solution of potassium sulfate is obtained, separating the residual insoluble compounds containing alumina, silica, iron and titanium components, digesting said residual compounds with an acid, heating the acid solution until excess acid is removed, separating the acid solution of the aluminum and iron components from the unsoluble silica and titanium components, adding sodium hydroxide to the said solution so as to precipitate aluminum and iron hydroxides, separating said hydroxides from said solution and treating them with sodium hydroxide to convert the aluminum hydroxide into soluble sodium aluminate; separating the insoluble iron hydroxide from the solution; adding carbon dioxide to the solution to convert the soluble sodium aluminate to insoluble aluminum hydroxide; and heating said aluminum hydroxide to convert it into pure aluminum oxide.

5. The process of treating alunite and similar ores containing iron, titanium and silica impurities, to recover therefrom their valuable constituents, which comprises the steps of crushing and screening the ore to substantially uniform mesh sizes, heating said ore in an oxidizing atmosphere at temperatures from 750° C. to 950° C. until the sulfur trioxide combined with the alumina is driven off, leaching the residue with water so that a solution of potassium sulfate is obtained, separating the residual insoluble compounds containing alumina, silica, iron and titanium components, digesting said residual compounds with an acid, heating the acid solution until excess acid is removed, separating the acid solution of the aluminum and iron components from the insoluble silica and titanium components, treating the said solution so as to precipitate aluminum and iron hydroxides, separating the insoluble hydroxides from the solution; treating the insoluble hydroxides with an alkali to convert the aluminum hydroxide into a soluble compound of aluminate; separating the insoluble iron hydroxide from the solution; treating the solution to convert the aluminate to aluminum hydroxide; and heating said aluminum hydroxide to convert it into aluminum oxide.

6. The process of treating alunite and similar ores containing iron, titanium and silica impurities, to recover therefrom their valuable constituents, which comprises the steps of crushing and screening the ore to substantially uniform mesh sizes, heating said ore in an oxidizing atmosphere at temperatures from 750° C. to 950° C. until the sulfur trioxide combined with the alumina is driven off, leaching the residue with water so that a solution of potassium sulfate is obtained, separating the residual insoluble compounds containing alumina, silica, iron and titanium components, digesting said residual compounds with an acid, heating the acid solution, until excess acid is removed, separating the acid solution of the aluminum and iron components from the insoluble silica and titanium components, treating the said solution so as to precipitate aluminum and iron hydroxides, separating said hydroxides from said solution by adding an alkali to convert the aluminum hydroxide to a soluble aluminate compound; separating the insoluble iron hydroxide from the solution; treating the solution to convert the aluminate compound to the insoluble aluminum hydroxide; separating the insoluble aluminum hydroxide from the solution with a filter press; and heating said aluminum hydroxide above 800° C. to convert it into pure aluminum oxide.

ROBERT C. HAFF.